(No Model.)
J. L. HEISE.
WEATHER PROTECTOR FOR CARRIAGES.
No. 377,105. Patented Jan. 31, 1888.
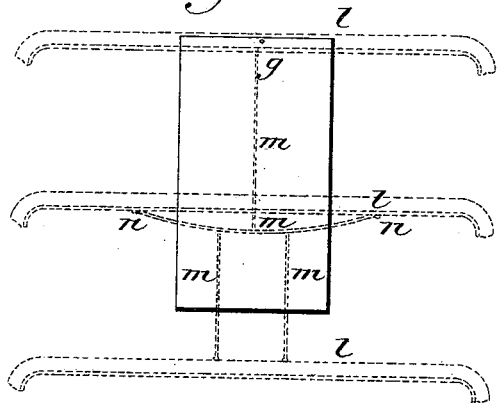
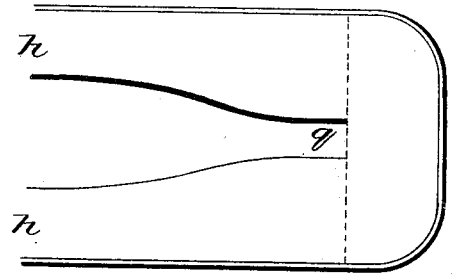
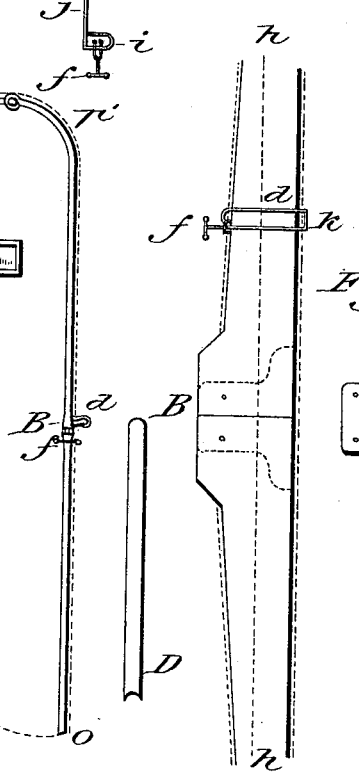
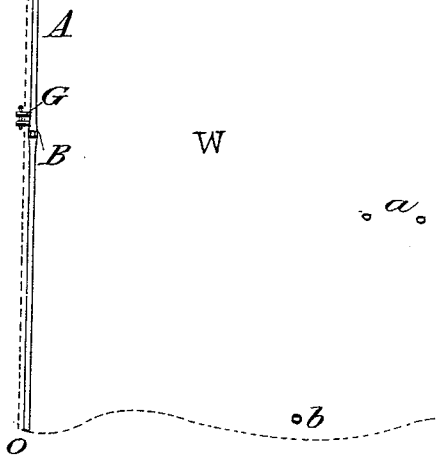
Witnesses:
E. M. Olds.
Charles Dresback
Inventor:
J. L. Heise

UNITED STATES PATENT OFFICE.

JOHN L. HEISE, OF UNION, OHIO.

WEATHER-PROTECTOR FOR CARRIAGES.

SPECIFICATION forming part of Letters Patent No. 377,105, dated January 31, 1888.

Application filed June 22, 1886. Serial No. 205,948. (No model.)

*To all whom it may concern:*

Be it known that I, JOHN L. HEISE, a citizen of the United States, residing at Union, in the county of Montgomery and State of Ohio, have invented a new and useful Weather-Protector for Buggies, Carriages, Jagger-Wagons, Huckster-Wagons, and all Covered Vehicles, of which the following is a specification.

My invention relates to improvements in weather-protectors for covered vehicles, which have heretofore afforded their passengers with no convenient and complete protection in front against rain, storms, wind, and cold.

My objects are, first, to close the front of the vehicle entirely and closely, and at the same time afford the driver and passengers with light and good front view; second, to afford the means of quickly fastening, loosening, and opening the protector, thus avoiding all danger in its use in case of accident; and, third, to provide convenience in folding and carrying the protector with the vehicle at all times. I attain these objects by the mechanism illustrated in the accompanying drawings, in which—

Figure 1 is the entire frame-work of the protector, which fits inside the top close around to the bow, and is fastened to it at three points—the top and each side. Fig. 2 is a folding joint sawed vertically along the side of the tongue, showing how it is constructed and works. Fig. 3 is the joint folded. Fig. 4 is the hand-hold which is used in fastening and in opening the protector. Fig. 5 is the protector folded and swung in the top of the buggy or other vehicle. Figs. 1 and 5 may be considered as viewed by one seated in the vehicle.

Similar letters refer to similar parts throughout the several views.

In Fig. 1, A represents the frame-work of the protector, which fits inside the cover of the vehicle, and may be attached to any one of its bows, usually the first or second, by simply putting a little screw-eye in the bow at its center and placing the little hook in the top of the protector in it. Here it may hang all the time that it is in use, and on account of its joints swings freely when not fastened at the sides, and the cloth or leather is almost as limber as if there were no frame in it, thus making it easy for getting in and out of the vehicle. It may be fastened on either side by a hook-spring, $d$, which slides over the bow from the back part of it forward, and is fastened in front, as hereinafter described, or by a clevis and pin which slides over the bow, as shown at G. The frame is so constructed that the fastenings at these three points alone keep each of its parts in its place and makes the whole frame stiff. The dotted line around the outside represents the bow. A flexible covering, W, of leather, oil-cloth, rubber, or any kind of cloth made impervious to water, is fastened to the frame, extending from one side to the other, by long tin or sheet-iron clamps, as shown in D, so as to be easily changed, or by sewing the edges around the frame. $a$ $a$ are holes in the covering for the passage of the reins.

B B are double knuckle-joints, hereinafter explained.

$c$ C $c$ are lights of ordinary glass. C', between Figs. 1 and 5, is a large-sized light, made of isinglass strengthened by cross-wires, which may be used where large size or light weight is required.

$e$ $e'$ are tongue folding joints, made by sawing into the ends of the frame parts and inserting a tongue and then putting a pin through each end of it. At O O the corners of the cloth or leather may be attached to the ends of the frame by gum stretchers, so as to allow the protector to adjust itself closely about one or more persons using one or more robes.

Fig. 2 is a double knuckle-joint sawed vertically at the upper side of the tongue. The dark heavy line running across the middle represents the meeting of the ends of the joint. The space between the dotted lines running crosswise and the side lines represent the depression made in the ends, in which the tongue E fits, and is pinned through the holes represented by the dots. The fangs of the tongue will allow the hinge to move in but one direction—that of the dotted lines from $h$ to $h$. Then it takes the form represented in Fig. 3, thus affording a space, $g$, between its parts in which the cloth or leather of the protector folds without breaking.

In Fig. 4, $f$ is the hand-hold which stands out from the frame toward you when the protector is in use, and may be very readily grasped by the hand at any time. It is kept standing by means of a little shoulder just beneath it on $i$, over which it turns in folding. $c$ is the part which runs through the upper end of the joint, and has a fastener, $k$, on the end of it, as is shown in Fig. 2. $d$ is a stiff steel spring, which slips tightly over the bow from behind, thus making the joint and frame extend along the inside of the bow, while the spring itself bends around the back part of the bow and then runs across the outside of it, as shown in Figs. 1 and 2. $f$ is then turned, bringing $i$ against the bend in $d$, where it then rests. The end of $f$ which stands to the outside being heavier than the other end, it is kept by that alone to its place. When $f$ is thus turned, it brings $k$ across the front part of the bow, meeting the end of $d$, as shown in Fig. 2, thus fastening the frame securely on that side. This same fastening may be used on one or both sides, or the clevis G, whichever will best suit the class of protector used.

When there is no bow to which to fasten at the sides, a joint equivalent to $e\ e'$ may be used in place of the one just described, and stiffened by a long band-ring being slipped over it.

In Fig. 5, $l\ l\ l$ represent the tops of the bows; $m\ m\ m$, the straps which keep the protector when folded tight to the top or side of the vehicle. These straps have snaps on their ends which hook in screw-eyes in the bows. $n\ n$ are snaps, either one of which being loosened or fastened will control all the straps sufficiently well for the loosening and fastening of the protector.

Little rings may be fastened in the vehicle for the purpose of inserting the ends of the frame O O when required by a particular use of the protector.

To use the protector, unfold it and hook it first at the top $g$, then fasten at each side, as hereinbefore explained. This is all the fastening that is necessary to keep all the parts of the protector well to their places and in use, since the ends O O come against the vehicle and thus stiffen the frame, as the side folding joints only bend one way, which is thus prevented. To loosen it, grasp the handle $f$, turn it half around, so as to bring $k$ from the front of the bow to the frame, then pull toward you, and the one half of the protector immediately swings freely. The passengers can then get out and fasten the protector from the outside to protect the inside of the vehicle. To fold it, loosen it at the sides, but not at the top, then bring O O up to P P and button $b$ over $b'$, then fold from the right, bringing P' over $e'$ to $e$, then fold from the left, bringing P over $e$ to $e'$, the tongue at $e$ being longer than that at $e'$, so as to allow the fold. It may then be swung in the top of the vehicle, as shown in Fig. 5, and carried there or taken off and put under the seat. It may also be loosened at one side and the top, and swung to one side, fastened, and carried there.

I claim and desire to secure by Letters Patent—

1. A protector for the front of a carriage, consisting of the sectionally-hinged frame A, having a flexible covering, W, and fastening devices $g$, G, and $f$, whereby the said protector can be detachably secured to the upper part and to the sides of the front of a carriage-top, and also be readily removed and folded, as set forth.

2. The combination, with a carriage-top provided with the attaching device $g$ and with the straps $m$, of a folding frame, A, having the flexible covering W and fastening devices G and $f$, whereby the same may be detached, folded, and suspended in the top of the carriage, as set forth.

3. The herein-described protector for the front of a covered carriage, consisting of the sectionally-folded frame A, provided with fastening devices $g$, G, and $f$, and with the flexible covering W, the latter having the lights $c$ C $c$ and the holes $a$, as set forth.

4. The herein-described protector, consisting of a jointed rod frame covered with flexible material, said frame having the double knuckle-joints B, and also provided with devices for attaching the same to the front of a carriage-top, as set forth.

JOHN L. HEISE.

Witnesses:
 E. E. SMITH,
 F. S. HARBERT.